Figure 1:
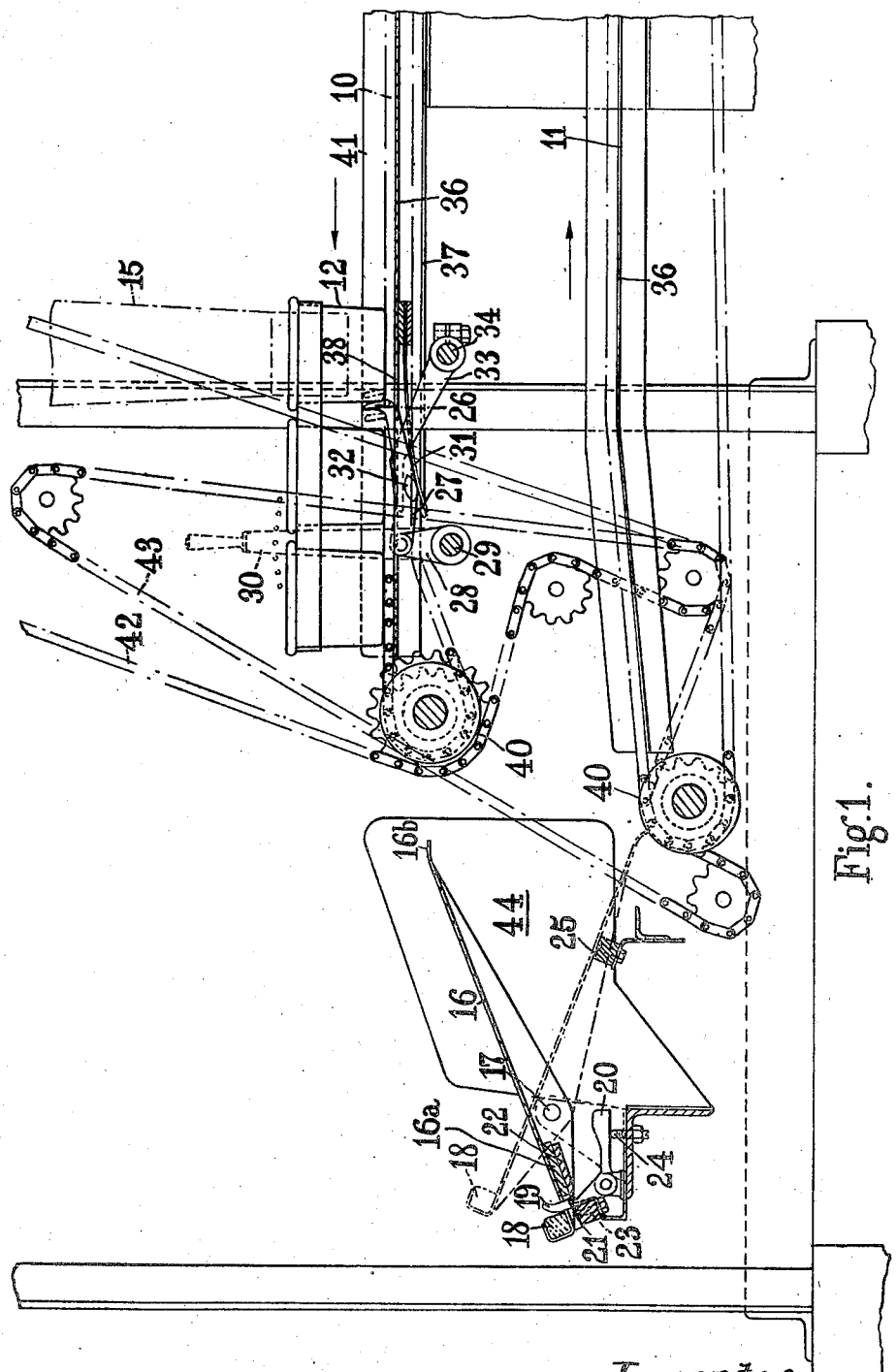

July 10, 1945.  L. S. HARBER  2,380,172
CONVEYING MEANS
Filed May 25, 1942  6 Sheets-Sheet 1

Inventor
L. S. Harber
By Glascock Downing Seebold Attys.

July 10, 1945.  L. S. HARBER  2,380,172
CONVEYING MEANS
Filed May 25, 1942   6 Sheets-Sheet 3
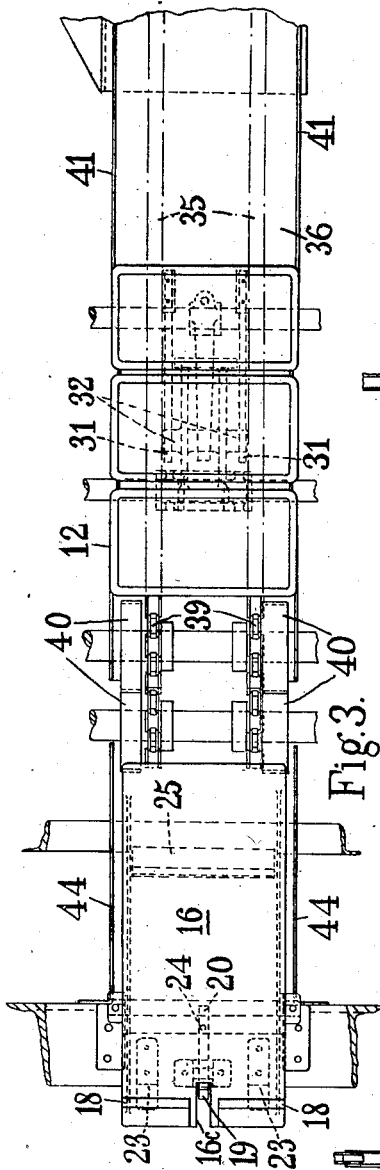
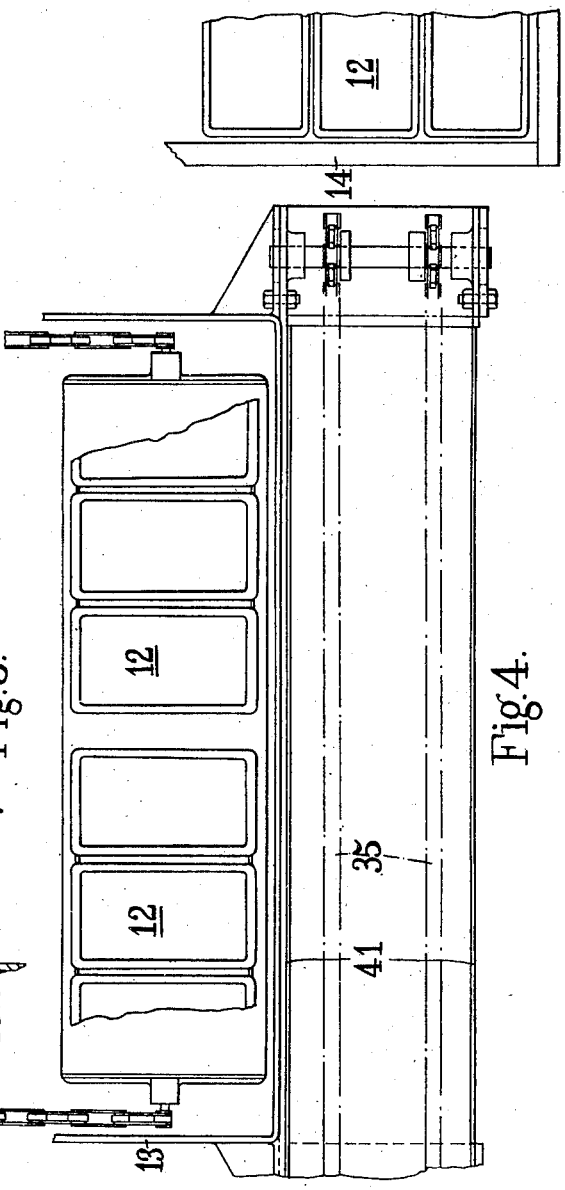
Inventor
L. S. Harber
By Glascock Downing Seebold
Attys.

July 10, 1945.   L. S. HARBER   2,380,172
CONVEYING MEANS
Filed May 25, 1942   6 Sheets-Sheet 6

Inventor
L. S. Harber
By Glascock Downing & Seebold
Attys.

Patented July 10, 1945

2,380,172

UNITED STATES PATENT OFFICE 2,380,172

CONVEYING MEANS

Laurence Seymour Harber, Peterborough, England, assignor to Baker Perkins Limited, Peterborough, England Application May 25, 1942, Serial No. 444,420
In Great Britain June 11, 1941

1 Claim. (Cl. 198—21)

This invention relates to methods and means for attending machines or operations and has for its object the reduction of staff attending the working of certain plant. There are many industrial operations which involve the attending and feeding of machines where one attendant has to supply a machine and another has to receive the goods or articles delivered from the machine after an operation or treatment has been carried out, or where one attendant has to feed vessels for filling to a machine while another receives the filled vessels and passes such elsewhere for another or further operation or treatment. For example, in the baking trade, for making tin bread, an attendant standing at a feeding station has to take empty baking tins from a rack and place such on a conveyor, which carries the tins to a dough-filling station, after which the filled tins are passed on to a discharge station, at which another attendant stands to remove the tins from the conveyor and place them in a prover or into racks for transfer to a prover.

An aim of the present invention is to provide improved means whereby a single attendant may do the work of the two attendants referred to in the preceding paragraph. It will be appreciated that the improved mode of operation involves the use of conveying means, and hence an object of the invention is to provide an improved conveyor (such as an endless chain or band) and a device operating in association therewith adapted to enable one attendant to do the work of two.

According to the invention chain or band conveying means are provided which are adapted to convey goods, articles or tins (hereinafter called "tins"), first in one direction and then in the opposite direction by the aid of a transfer device, adapted to transfer the tins from the end or other part of one conveyor to the end or part of the other (or oppositely moving) conveyor.

A chain or band conveyor may be superposed over a second chain or band conveyor, and transfer means in the form of a tilting platform or table located at one end of the conveyors and adapted to be operated by the weight of the tin (or tins) received from the upper conveying means to alter the inclination of the platform so that the tins slide on to the lower conveying means.

A feature of the invention lies in a tilting platform comprising a plate or like member pivoted on a horizontal axis and biased to incline upwardly towards the upper conveyor, in which position it is held by catch means releasable by a tin (when such has slid from the upper conveyor on to the platform), the arrangement being such that the weight of the tin (or tins) upon the platform overcomes the bias of the plate and causes it to assume a downwardly inclined position so that the tin (or tins) slide therefrom on to the lower conveyor.

The plate or platform may be counterbalanced by a weight or by spring means and the catch may be carried on the end of the platform adapted to engage a fixed member upon the frame of the machine; or the catch means may be mounted upon the frame and adapted releasably to engage the rear end of the platform.

The invention also consists in conveyor means comprising a pair of chain or band conveyors arranged side by side, and transfer means comprising a rotary table located at one end of the conveyors to receive tins from one conveyor and transfer them to the other conveyor.

The invention also consists in conveyor means arranged side by side, and transfer means adapted to move the tins in a transverse direction from one conveyor on to the other conveyor.

In the accompanying drawings—

Figure 2:
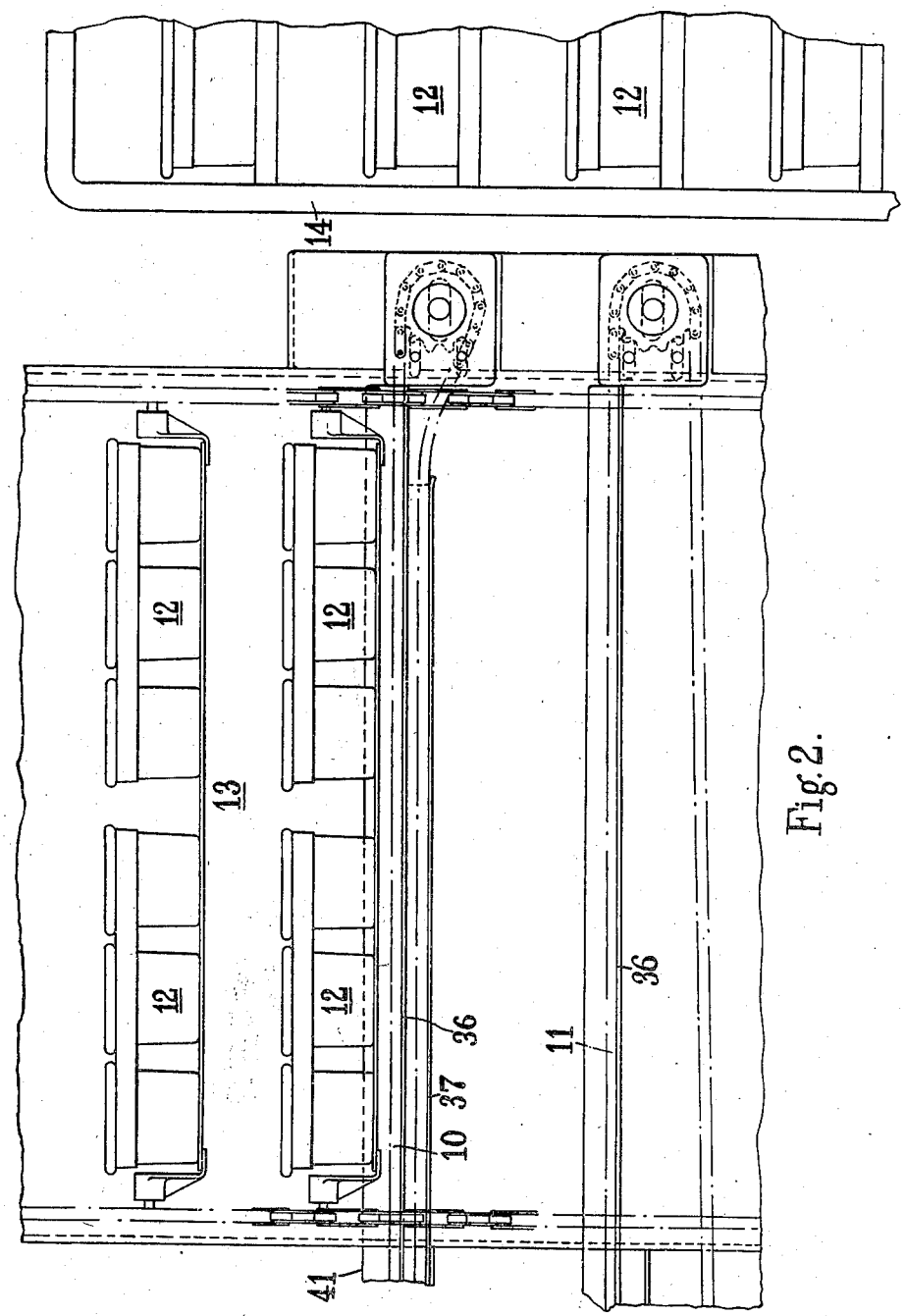
Figure 5:
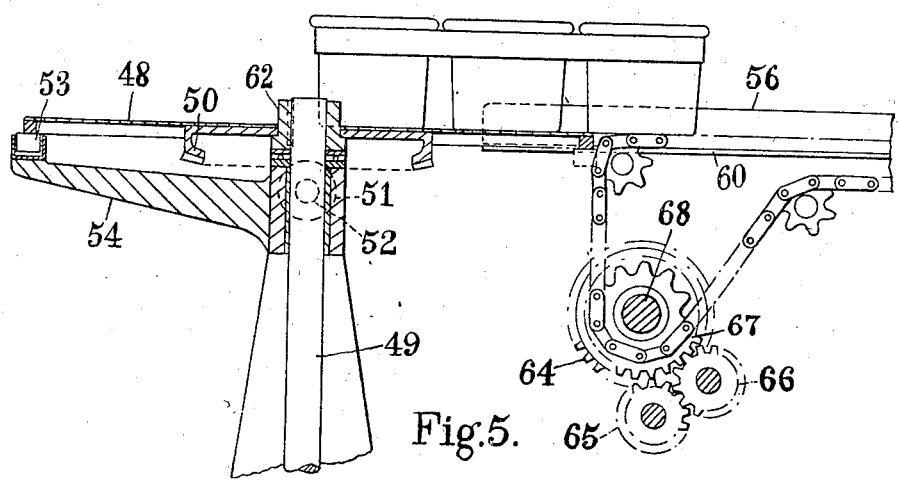
Figure 6:
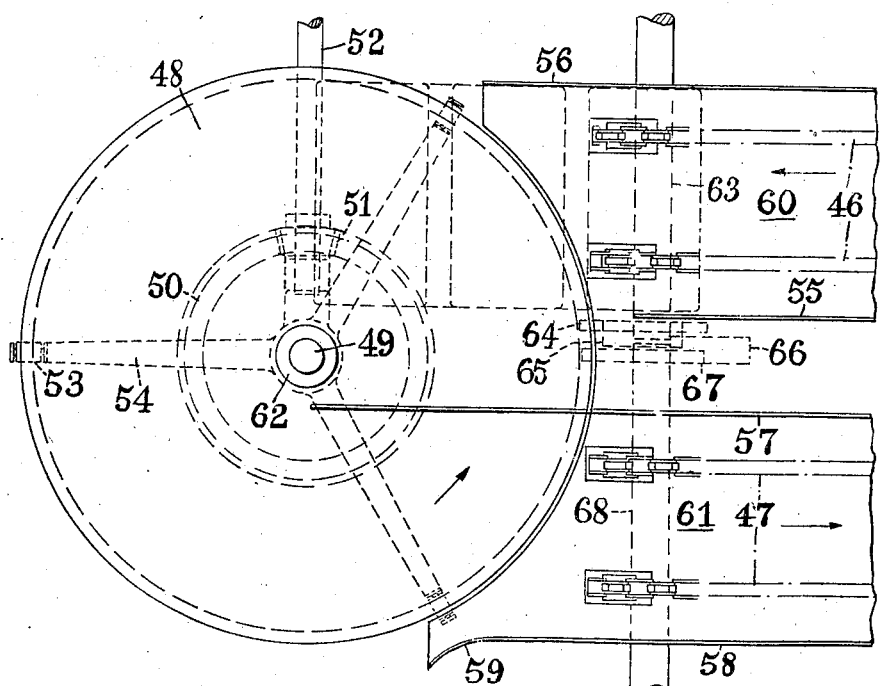
Figure 7:
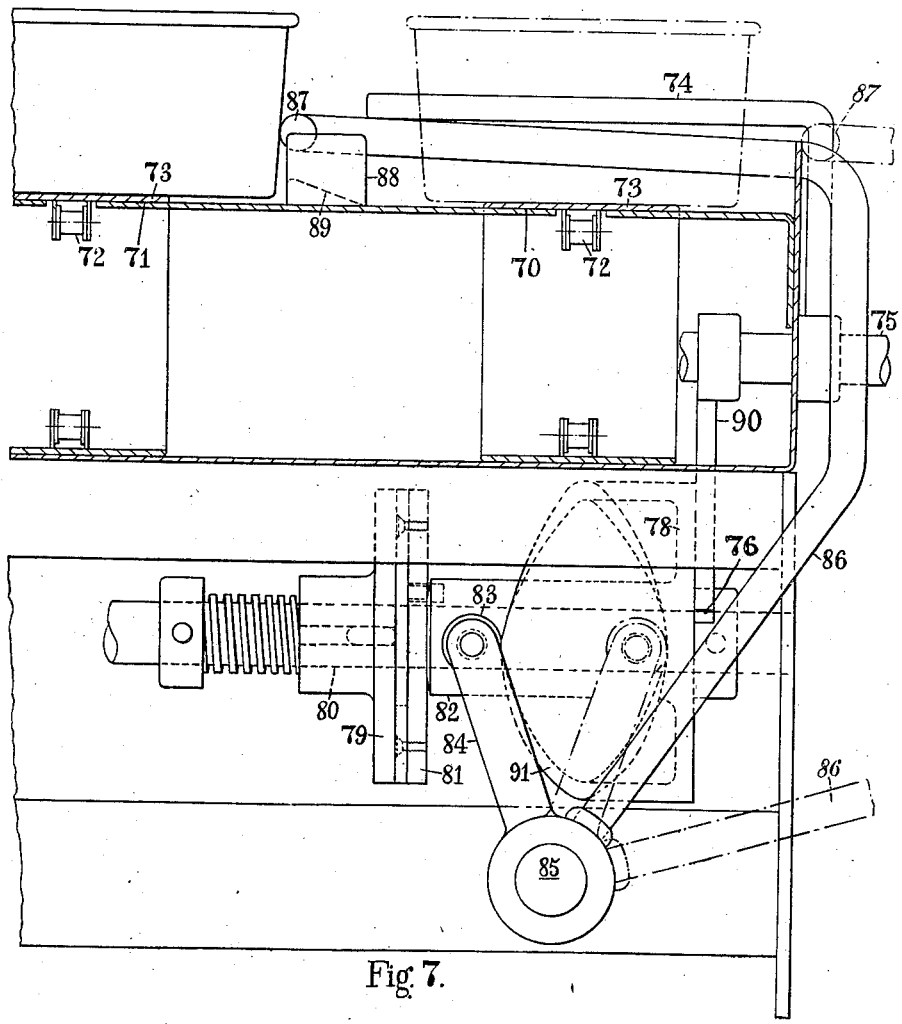
Figure 8:
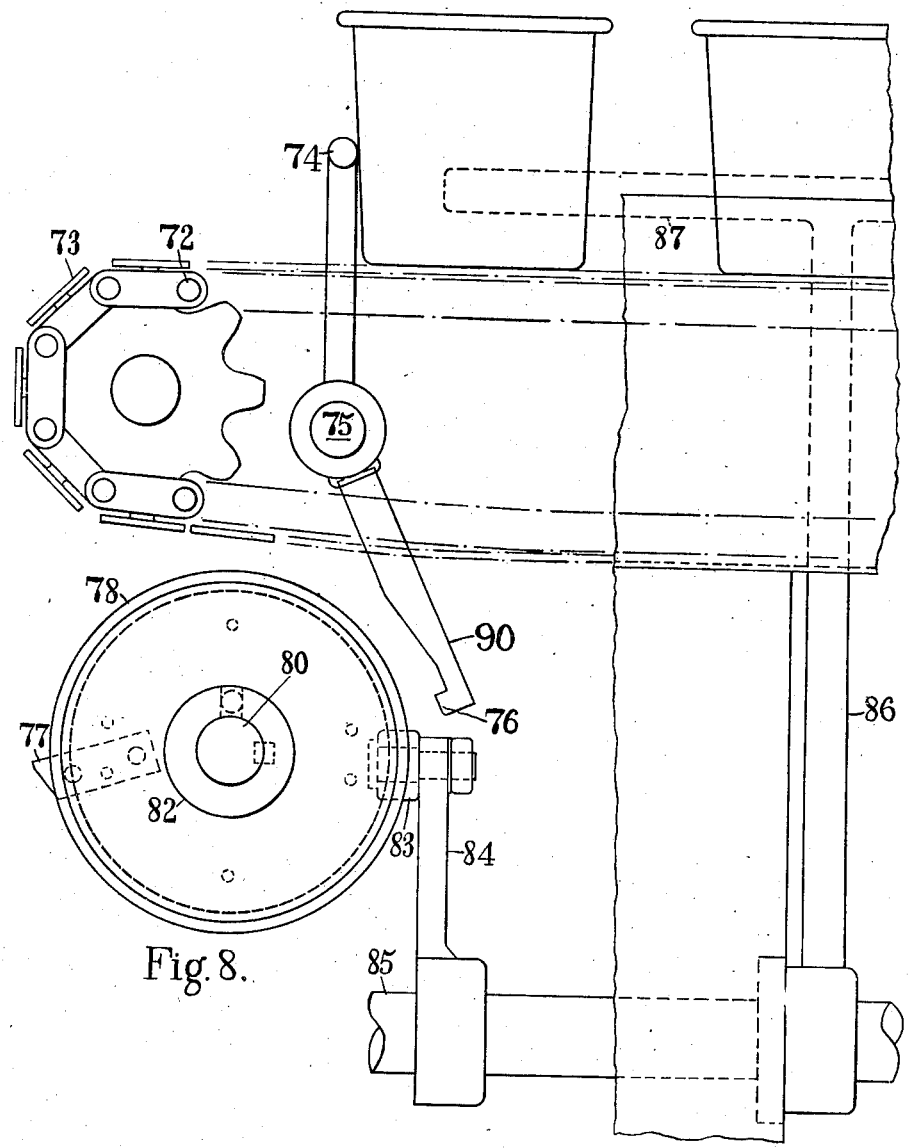

Figures 1 and 2 together form an elevation diagrammatically illustrating the invention as applied to the feeding of baking tins to a prover, Figures 3 and 4 together form a corresponding plan, Figure 5 is an elevation of a modified form of the invention, Figure 6 is a corresponding plan, Figure 7 is an end elevation of a further form of the invention, Figure 8 being a side view corresponding thereto.

In carrying the invention into effect according to one convenient mode as applied to the feeding of empty baking tins (in groups strapped together) from a position adjacent a prover (into which filled tins have to be deposited) to a machine or mechanism adapted to fill the tins with dough; two endless chain conveyors 10 and 11 (Figures 1-4) are mounted in superimposition in a framework so that the upper one 10 is arranged at a suitable operative height to carry baking tins 12 under a filling mechanism for depositing dough in the tins. The upper lap of this conveyor 10 is adapted to travel in one direction, say from right to left, and the upper lap of the second or lower conveyor 11 is adapted to travel in the opposite direction, i. e., from left to right, so that tins 12 that are passed outward on the upper conveyor 10 and are transferred to the lower conveyor 11 return to the initial or starting position or station.

Adjacent the prover 13 into which filled tins will be charged from the lower conveyor 11 a stand or trolley rack 14 is positioned, on which empty tins 12 are arranged or stacked. An attendant is posted at the prover end of the conveyors and his duty is to place the empty tins 12 upon the upper chain conveyor 10 and to take the filled tins from the lower conveyor 11 and place them in the prover 13. Towards the end of the upper conveyor 10 remote from the prover mechanical means represented by the chute 15 are provided for charging each tin with its required complement of dough.

After the tins have been filled they pass on and leave the upper conveyor 10 and travel on to a transfer device.

This transfer device comprises a platform or plate 16 which is pivoted towards its rear end on a horizontal pivot 17 arranged in a plane substantially half-way between the upper laps of the conveyors. The platform 16 overhangs the pivoted axis 17 at the rear and is provided with an edge or plate adapted to engage with a catch, as will be referred to hereinafter.

In rear of the pivot 17 a balance weight 16a or spring is provided which normally tends to hold the plate or platform 16 tilted so that its edge 16b lies adjacent the end of the path of the upper lap of the upper conveyor 10. The balance weight 16a or spring is so chosen that the reception of a tin (or a predetermined number of tins) upon the platform from the upper conveyor 10 will overcome the action of the weight 16a or spring and cause the platform to tilt downwardly in a reverse direction as soon as the catch holding it in the upwardly inclined position is released.

The platform 16 is provided with rubber buffers 18 located on either side of a slot 16c.

The buffers are adapted to take the shock of the tins sliding down the platform and arrest the movement of the tins.

Adjacent the rear of the platform and operating in the slot 16c therein is a pivoted catch 19 of bell-crank lever form, the lower arm 20 of which is weighted to cause the other end 19 to protrude through the slot. This end 19 of the lever has a detent 21 for engaging a striking plate 22 on the underside of the platform. Above the detent the lever has a shaped end or nose which is adapted to be engaged by the forward end of a group of tins as it slides down the platform 16 so as to cause the detent 21 to be released from the striking plate 22 and the platform to be depressed or overbalanced by the weight of the tins. As the platform 16 returns towards its upper or initial position as shown in full lines (when the tins have passed from it) the nose of the catch 19 (which may be of cam-like form) is contacted to cause the detent 21 to be re-engaged with the striking plate 22. Rubber buffers 23 are provided adjacent the catch 19 to absorb any shock of the platform as the latter returns after the tins have slid on to the lower conveyor 11.

A rubber buffer 25 is provided to absorb any shock caused when the platform tilts under the weight of the tins.

Adjustment of the catch 19 relatively to the striking plate may be effected by an adjustable bolt 24 engaging the weight arm 20 of the bell crank.

The upper conveyor 10 is adapted to feed the tins under the dough-feeding position or chute 15 in such manner that as each tin arrives in position it receives a charge of dough and is then moved forwardly to allow the succeeding and subsequent tins to pass to the charging position in turn. Accordingly, the conveyor may be moved stepwise to bring each tin in succession into the dough-feeding position but it is preferred to cause the conveyor to travel continuously and to provide a temporary tin stop 26, which is introduced in the path of the tins so that a tin is brought to rest against the stop for a period long enough to enable the tin to be charged, while the moving conveyor surface or chains slides beneath the tin. This stop 26 is removed as soon as the tin has been filled and reintroduced immediately the filled tin has passed so that the front of the next following tin is engaged and the group is again arrested, while the second tin of the group is filled, and so on.

The tin stop 26 may be in the form of a bent-up or erect portion on the end of a lever 27, the other end of which is pivoted to a displaceable piece or pivoted arm 28 so that the position of the stop may be varied longitudinally of the conveyor by adjusting its pivotal connection. The arm 28 is carried by the shaft 29 to which an adjusting lever 30 is secured so that the adjustment of the stop 26 may be effected. The stop 26 is normally urged upwardly against a limiting member by means of leaf or other springs 31 bearing upon projections or cross pieces 32 on the lever. The inner part of this projection or cross piece 32 on the lever 27 is engaged by a pivoted lever 33 mounted on an oscillable shaft 34 operated by any convenient mechanism to retract the stop 26, for example a rotary cam or a tooth on a wheel may be adapted to engage a roller on the end of an arm on the shaft 34 of the projection-engaging lever 33 and retract the stop 26 in synchronism with the operation of the means for depositing the dough into the tins or with the operations of turning of the prover associated with the dividing and proving of the dough prior to placing in the tins. The retraction of the stop 26 allows the advance of the tin 12 and as the stop returns (under spring pressure) it is held out of position by the bottom of the tin. As the tin slides beyond the stop 26, the latter is reintroduced in the tin path and is engaged by the next tin.

Each conveyor may comprise a pair of chains 35 the runs of which are supported by plates or guides 36, 37, the links of the chains forming smooth, flat surfaces over which the tins can slide. The plate 36 of the upper conveyor 10 is provided with an opening 38 through which the tin stop means projects. Side guides or fences 41 are provided on the plate 36. At the turning points adjacent the transfer device each conveyor chain sprocket wheel 39 is provided on one or both sides with a disc or roller 40 (covered with leather, rubber, fibrous friction material or the like), the radius of which is such that the periphery is above the chain surface at the turning point. The discs or rollers 40 control the tins 12 as they pass from the conveyor 10 to the tilting platform 16, and in the case of the lower conveyor 11 take the shock of the tins as they slide from the downwardly tilted platform and aid in easing the tins on to the lower conveyor surface.

The conveyors 10 and 11 are driven by chain drives 42, 43 from any convenient part of the apparatus to which the invention is applied such as the prover drive or the dough feeding mechanism.

The platform 16 operates between side plates 44 which ensure the correct placing of the tins on the platform and transference therefrom to the lower conveyor 11.

In operation, after the group of the tins 12 has been filled it is passed on by the conveyor 10 so that the forward end engages the rollers 40 and rides out over the turning point of the conveyor. As the group passes over the half-way position it overbalances and slides on to the upwardly tilted transfer platform 16, down which the group slides being assisted by the drive of the leather-covered discs or rollers 40. The group of tins slide down the platform 16 until the foremost tin strikes the catch 19 and releases it from the striking plate 22 being brought to rest by the buffers 18. Immediately this happens the platform, owing to the preponderance of weight on the forward side of its pivot 17 due to the presence of the charged tins, tilts downwardly so that its end lies adjacent the leather-covered discs or rollers 40 at the turning point of the lower conveyor 11. As soon as the platform 16 assumes the downward tilt the group of tins commences to slide off it, and the forward tin meeting the leather-covered discs or rollers 40 is fed forward on to the upper lap of the lower conveyor. As the conveyor surface 11 causes the tins to travel and the heel of the last tin passes from the platform 16, the counterweight 16a or spring of the platform returns it to the upwardly inclined or initial position, causing the catch or detent 21 to be re-engaged with the striking plate 22 so that the platform is held in the inclined position ready to receive the next group of tins from conveyor 10.

It will be appreciated that the length of the platform 16 and position of the catch 19 are devised to accord with the length of a group of tins. Where it is desired that the platform should operate in conjunction with one or two tins only, or where the weight of the tins and position in respect to the pivot and catch should be such that there would be no preponderance of weight on the near side of the pivot of the platform which would cause it to be overbalanced and assume the downwardly tilting position, an adaptor plate or member may be provided to intervene between the end of the catch and the front of the tin in a position suitable (by reason of the leverage) for causing the overbalancing effect. The adaptor plate operates in the sense of an advanced stop so that when a single tin, or the leading tin of a pair, strikes the plate it will slide or move backwardly and cause the catch to be released and then be arrested by the rubber buffers 18. The adaptor may comprise a plate sliding on the platform 16 and having upturned ends, one to lie in the path of the tins and the other to engage the catch 19 and buffers 18. A light spring may be employed to return the adaptor to its initial or set position or such resetting may be effected by and when the catch 19 is reset.

The filled tins, after being received from the tilting platform 16, by the upper lap of the lower conveyor 11, travel towards the station or position from which they started and the attendant now removes the filled tins from the lower conveyor 11 and places them in the prover 13. Thus a single attendant serves to do the work of the two usually employed respectively for feeding and unloading the conveying means.

It will be appreciated that the empty tins may be taken from the prover, filled, and returned to the prover by the apparatus described.

While the invention has been described with reference to conveyors that are in the same vertical plane, i. e., superposed conveyors, it may be applied to conveyors that are in the same or parallel horizontal planes but are not in superimposition, in which case the transfer means may be in the form of a switch device pivoted on a vertical pivot, or a rotary turntable device adapted to carry the tins from the end of the feeding conveyor to the end of the return conveyor.

Thus, referring to Figures 5 and 6 the empty tin conveyor and full tin conveyor comprising chains 46 and 47 are placed side by side in the same horizontal plane.

Adjacent the transfer ends of the conveyors a rotary table 48 is provided which is secured to a central shaft 49 and is driven by the bevel gears 50, 51 from a driving shaft 52. The rotary table is supported at its periphery by rollers 53 carried by arms 54.

The upper surface of the rotary table 48 is located in the plane of the supporting surfaces of the chain conveyors or it may be slightly higher and such surface may have a friction covering such as leather to provide a gripping and driving effect as the tins are transferred.

The tin conveyor 46 is provided with inner and outer fences 55, 56, the inner terminating short of the rotary table 48 while the outer fence is extended beyond the terminal wheels of the chains 46 to control the "tail" of the set of tins and prevent it slewing round when the influence of the table overcomes the influence of the chain conveyors 46. The fence terminates at a position such that the middle tin of the set is substantially radial to the table when the tailing tin leaves the end of the fence 56.

The tin conveyor 47 is also provided with side fences 57, 58 the inner of which 57 extends about halfway across the rotary table 48 and acts as a plough against which the tins abut during their transference from the rotary table 48 to the conveyor 47. The outer fence 58 extends beyond the conveyor terminal wheels and has its end 59 outwardly splayed for directing the leading edge of a tin set inwardly should the tins have become dislodged on the table. Instead of the fence 57 extending over the table a belt conveyor operating upon vertical axis terminal rolls may be provided to impart a positive drive to the leading edge of the tins.

The chains 46 and 47 run on supporting plates 60, 61 which may be extended up to the periphery of the rotary table 48 as shown.

At the upper end of the shaft 49 a boss 62 is provided which forms an abutment preventing the tins crossing the rotary axis of the table.

The conveyors 46, 47 are conveniently driven from a shaft 63 having a gear 64 meshing with a broad gear 65. The gear 65 in turn meshes with another broad gear 66 which meshes with a gear 67 on an aligned shaft 68. The shafts 63 and 68 are provided with sprockets driving the respective conveyor chains 46 and 47.

In operation, tins on the conveyor 46, after receiving the dough are fed on to the rotary table 48, the trailing tin of a set being maintained in abutting relation with the fence 56 until the set is uniformly placed on the rotary table with the middle tin substantially radial with respect to the table.

The tins are carried round until the leading tin engages the fence 59 of the conveyor 47. This engagement causes the set of tins to be positioned substantially parallel with the conveyor as the tins are pushed on to the conveyor by the driving action of the table.

It will be noted that by the control of the tins through the fence 56 as they are transferred to the rotary table the use of a relatively small table is permitted, the diameter of the table being little more than the combined widths of the two conveyors 46, 47.

In the event of using single tins or pairs of tins strapped together it will be appreciated that the fence 56 will be extended a distance sufficient to resist the rotary thrust of the table until the tins are well placed on the table without any substantial overhang of the tin or tins.

To aid in the transfer of the tins to the rotary table, particularly when dealing with single tins, the end portion of the fence 56 may be replaced by a positive driving means such as a band conveyor mounted upon vertical axis end rolls.

According to a further modification, see Figures 7 and 8, the conveyors 70, 71 are arranged side by side in the same horizontal plane and may comprise chains 72 to which slats 73 are secured.

At the point of transfer a cranked trigger arm 74 extends across the conveyor 70 in the path of the tins. The trigger arm is secured to a shaft 75 which also carries an arm 90 the lower end of which is provided with a catch 76 adapted to lie in the path of a detent 77 carried by a rotary drum 78.

The drum is adapted to be rotated by friction driving means comprising a continuously rotating disc 79 keyed to the shaft 80 and spring pressed into engagement with a disc 81 secured to the boss 82 of the drum 78. The discs 79 and 81 are provided with suitable friction surfaces.

The drum 78 is provided with a cam face 91 with which a roll 82 engages. The roll is mounted on an arm 84 secured to the rock shaft 85. The rock shaft 85 also carries an oscillating pusher arm 86 which is adapted to move transversely of the conveyors and push the tins from the conveyor 70 on to the conveyor 71.

The pusher arm 86 is provided with a T-piece 87 lying parallel to the path of the conveyor. The form of the arm 86 may be such that its weight provides a bias tending to rotate it clockwise as seen in Figure 7, or a spring may be provided for this purpose.

A fence 88 is provided between the conveyors and at the point of transfer this is cut away to provide a ramp 89 for lifting the tin being transferred and avoid it catching on the edge of the conveyor 71.

It will be appreciated that with this form of the invention the transfer of tins may occur at any predetermined point of the conveyors and not necessarily at the ends thereof.

In operation, as a tin is advanced by the conveyor 70 it engages the trigger arm 74 and rocks the shaft 90 thus removing the catch 76 and releasing the drum 78. The latter immediately rotates by the slip friction drive 79 and 81 and by the cam 91 causes the shaft 85 to rotate thus pivoting the pusher arm 86 which engages the tin by the T head 87 and transfers the tin over the ramp 89 and on to the conveyor 71. During the transfer movement the tin is guided by the trigger arm.

After the tin has been transferred the trigger arm 74 returns to its initial position with the catch 76 in the path of the detent 77 whereby the rotation of the drum is stopped at the end of one revolution thereof. This returns the pusher arm to its position laterally of the conveyor 70. The return movement of the trigger arm may be effected by a returning spring or by gravity.

I claim:

In the manufacture of tin bread, a pair of tin conveyors having conveying laps arranged side by side, means for imparting continuous movements to the conveyors so that said laps move in opposite directions, a rock shaft mounted on an axis parallel to the direction of travel of said conveyors, a pusher arm secured to said rock shaft and having a part movable in a path across the conveyor for transferring a tin from one conveyor to the other, a rotary cam, a rocker arm on said shaft and engaging the cam, slip friction means for intermittently driving the cam, a detent on said cam, a catch normally engaging the detent to prevent rotation of the cam, a trigger controlling said catch and located in the path of the tins on the conveyor from which the transfer is to take place, said trigger automatically removing said catch when a tin arrives in the transfer position and engages said trigger.

LAURENCE SEYMOUR HARBER.